US011027595B2

(12) United States Patent
Smith et al.

(10) Patent No.: US 11,027,595 B2
(45) Date of Patent: Jun. 8, 2021

(54) ROOF FAN ASSEMBLY (71) Applicant: DOMETIC SWEDEN AB, Solna (SE)

(72) Inventors: Mark L. Smith, Buchanan, MI (US);
Aaron L. Harris, Lapeer, MI (US);
Hari R P Sunkara, Elkhart, IN (US);
James E. Allard, Davisburg, MI (US)

(73) Assignee: Dometic Sweden AB, Solna (SE)

( * ) Notice: Subject to any disclaimer, the term of this patent is extended or adjusted under 35 U.S.C. 154(b) by 356 days.

(21) Appl. No.: 15/292,239

(22) Filed: Oct. 13, 2016

(65) Prior Publication Data
US 2018/0105020 A1    Apr. 19, 2018

(51) Int. Cl.
B60H 1/24       (2006.01)
B60H 1/26       (2006.01)
B60H 1/00       (2006.01)
B60J 7/16       (2006.01)

(52) U.S. Cl.
CPC ......... B60H 1/262 (2013.01); B60H 1/00364 (2013.01); B60J 7/1642 (2013.01)

(58) Field of Classification Search
CPC ............ B60H 1/267; B60H 1/00364
USPC ...................................................... 454/94
See application file for complete search history.

(56) References Cited

U.S. PATENT DOCUMENTS

| 536,156 | A | | 3/1895 | Rice | |
|---|---|---|---|---|---|
| 1,573,455 | A | * | 2/1926 | Sibley | E05C 17/30 49/339 |
| 1,692,073 | A | | 11/1928 | Brenner | |
| 2,140,865 | A | * | 12/1938 | Tuttle | B60H 1/262 454/129 |
| 2,372,164 | A | * | 3/1945 | Woodhams | B60H 1/262 454/94 |
| 3,016,952 | A | | 1/1962 | Shero | |
| 3,934,383 | A | | 1/1976 | Perry et al. | |

(Continued)

FOREIGN PATENT DOCUMENTS

| AU | 359397 | 12/2014 |
|---|---|---|
| AU | 359396 | 2/2015 |

(Continued)

OTHER PUBLICATIONS

Canadian Patent Application 2,981,668 entitled "Roof Fan Assembly" filed Oct. 5, 2017.

(Continued)

Primary Examiner — Helena Kosanovic
(74) Attorney, Agent, or Firm — Middleton Reutlinger (57) ABSTRACT Present embodiments provide a roof fan assembly with numerous improvements. The roof fan assembly includes a cover which allows for a fan shroud to be opened. The structure includes a base clamp which connects to the roof of an RV. The base clamp includes a fan and motor which push or pull air out from the RV or into the RV. The base clamp includes a worm gear assembly which includes a worm gear structure to open and close the shroud. The arm may include a sleeve which moves relative to the arm and connects to the shroud at the opposite end. The base clamp includes mounts for connecting the base clamp to the roof as well as allowing for connection of the cover to the fan assembly as a whole. Still further, the structure provides integrated hinges in the base clamp to allow connection of the shroud to the base clamp for pivotal movement.

14 Claims, 8 Drawing Sheets

(56) References Cited

U.S. PATENT DOCUMENTS

| | | | |
|---|---|---|---|
| 3,979,148 A | 9/1976 | Martin | |
| 4,038,911 A | 8/1977 | Hart | |
| 4,300,440 A | 11/1981 | Holter | |
| 4,395,939 A | 8/1983 | Hough et al. | |
| 4,615,263 A | 10/1986 | Titterud | |
| 4,633,769 A | 1/1987 | Milks | |
| 4,759,270 A * | 7/1988 | Lindeen | B60H 1/00364 403/408.1 |
| 4,872,722 A | 10/1989 | Farmont | |
| 5,407,038 A * | 4/1995 | Pedlar | A45C 5/02 190/107 |
| 5,672,101 A | 9/1997 | Thomas | |
| 5,730,583 A | 3/1998 | Alizadeh | |
| 5,797,648 A | 8/1998 | Fiegel et al. | |
| 5,839,229 A * | 11/1998 | Briggs | E05F 11/14 49/246 |
| 5,984,405 A | 11/1999 | Ciacci | |
| D421,798 S | 3/2000 | Liang | |
| 6,179,034 B1 | 1/2001 | Fuss | |
| 6,241,474 B1 | 6/2001 | Alizadeh et al. | |
| D446,295 S | 8/2001 | Williams et al. | |
| 6,347,484 B1 | 2/2002 | Swanger | |
| 6,438,800 B1 | 8/2002 | Narang et al. | |
| 6,442,896 B1 | 9/2002 | Chapin, III | |
| D495,041 S | 8/2004 | Thomas | |
| 7,021,006 B2 | 4/2006 | Farrar et al. | |
| 7,419,368 B2 | 9/2008 | Milks | |
| 7,731,574 B2 | 6/2010 | Milks | |
| 7,762,765 B2 | 7/2010 | Milks | |
| D654,920 S | 2/2012 | Wang et al. | |
| 8,177,496 B2 | 5/2012 | Wilson et al. | |
| D661,386 S | 6/2012 | Bergin | |
| D712,531 S | 9/2014 | Bergin | |
| D715,907 S | 10/2014 | Bergin | |
| D716,925 S | 11/2014 | Bergin | |
| D723,152 S | 2/2015 | Xu et al. | |
| D725,257 S | 3/2015 | Huang et al. | |
| D726,300 S | 4/2015 | DeFilippis | |
| D734,845 S | 7/2015 | Xu et al. | |
| D736,368 S | 8/2015 | Xu et al. | |
| D742,294 S | 11/2015 | Iancului | |
| 9,399,183 B2 | 7/2016 | McVay et al. | |
| D762,528 S | 8/2016 | Allard et al. | |
| 9,557,072 B2 | 1/2017 | Tolinski et al. | |
| D782,939 S | 4/2017 | Allard et al. | |
| D782,940 S | 4/2017 | Allard et al. | |
| D782,941 S | 4/2017 | Allard et al. | |
| D785,771 S | 5/2017 | Bergin | |
| D787,037 S | 5/2017 | Allard et al. | |
| D806,223 S | 12/2017 | Allard et al. | |
| D832,987 S | 11/2018 | Bergin | |
| D841,139 S | 2/2019 | Bergin | |
| 2003/0012656 A1 | 1/2003 | Cho et al. | |
| 2004/0175270 A1 | 9/2004 | Havel et al. | |
| 2005/0003751 A1 | 1/2005 | Thomas | |
| 2005/0180849 A1 | 8/2005 | Chen et al. | |
| 2005/0207894 A1 | 9/2005 | Park | |
| 2007/0166165 A1 | 7/2007 | Lee | |
| 2008/0139101 A1 | 6/2008 | Bickel et al. | |
| 2008/0156282 A1 | 7/2008 | Aschermann | |
| 2008/0210409 A1 | 9/2008 | Saksager | |
| 2008/0302019 A1 * | 12/2008 | Milks | B60J 7/1642 49/375 |
| 2009/0155076 A1 | 6/2009 | Jarrah | |
| 2010/0056035 A1 * | 3/2010 | Hua | B60H 1/262 454/139 |
| 2010/0068060 A1 | 3/2010 | Ota et al. | |
| 2010/0260630 A1 | 10/2010 | Bilodeau et al. | |
| 2011/0135494 A1 | 6/2011 | Nicgorski et al. | |
| 2011/0236211 A1 | 9/2011 | Schneider et al. | |
| 2012/0224988 A1 | 9/2012 | Maier et al. | |
| 2012/0244000 A1 | 9/2012 | Turcas | |
| 2013/0147312 A1 | 6/2013 | Qin et al. | |
| 2013/0323062 A1 | 12/2013 | Henner et al. | |
| 2014/0030104 A1 | 1/2014 | Lee et al. | |
| 2014/0056710 A1 | 2/2014 | Henner et al. | |
| 2014/0119922 A1 | 5/2014 | Nakano et al. | |
| 2014/0334952 A1 | 11/2014 | Ziegler et al. | |
| 2015/0064011 A1 | 3/2015 | Xu et al. | |
| 2015/0078937 A1 | 3/2015 | Crevel et al. | |
| 2015/0352924 A1 | 12/2015 | Allard et al. | |
| 2016/0200174 A1 * | 7/2016 | Tremer | B60H 1/262 454/111 |

FOREIGN PATENT DOCUMENTS

| | | |
|---|---|---|
| AU | 367696 | 3/2016 |
| AU | 367699 | 3/2016 |
| AU | 367700 | 3/2016 |
| AU | 367701 | 3/2016 |
| CA | 159763 | 11/2014 |
| CA | 166627 | 4/2016 |
| CA | 166057 | 9/2016 |
| CA | 170268 | 9/2016 |
| CA | 174116 | 2/2018 |
| CA | 179097 S | 2/2018 |
| CN | 3545706 | 12/2015 |
| DE | 19607931 | 2/1998 |
| EP | 002591586 | 2/2015 |
| EP | 002919936 | 12/2015 |
| WO | 2015191029 | 12/2015 |

OTHER PUBLICATIONS

Examiner's Report issued in CA Application No. 174116 dated Nov. 7, 2017.
Requirement for Restriction/Election issued in U.S. Appl. No. 29/580,801 dated Jan. 3, 2018.
Notice of Allowance issued in U.S. Appl. No. 29/580,801 dated May 29, 2018.
Notice of Allowance issued in U.S. Appl. No. 29/642,946 dated Sep. 26, 2018.
Canadian Patent Application No. 2,951,956 entitled "Shrouded Roof Vent for a Vehicle" entered national stage on Dec. 9, 2016.
U.S. Patent and Trademark Office International Search Report for PCT/US2014/041566 dated Oct. 24, 2014.
Canadian Design Patent Application No. 174116 entitled "Roof Fan Shroud" filed Apr. 11, 2017.
U.S. Appl. No. 15/198,697 entitled "Compact Fan for a Recreational Vehicle" filed Jun. 30, 2016.
U.S. Appl. No. 29/580,801 entitled "Roof Fan Shroud" filed Oct. 13, 2016.
U.S. Appl. No. 29/588,249 entitled "Fan" filed Dec. 19, 2016.
Fantastic ® Vent Fan with fan blade Model No. 8138-81 dated Feb. 13, 2015.
MaxxAir Fans, MaxxFan 4301K and 4401K; Jan. 22, 2016.
Dometic Product Catalog 2016, Fan-Tastic Vent Models; EZ-Breeze; Ultra Breeze. pp. 90-91. 2016.

* cited by examiner

ROOF FAN ASSEMBLY

CROSS-REFERENCE TO RELATED APPLICATIONS

Cross-reference is made to U.S. Design patent application Ser. No. 29/580,801 entitled "Roof Fan Shroud", which is filed on the same day as the present application and is expressly incorporated herein by reference.

BACKGROUND

Field of the Invention

The present disclosure relates to roof fan assemblies. More particularly, the present disclosure relates to roof fan assemblies and mechanisms for raising and lowering a shroud, connecting a cover and an integrated shroud pivot.

Description of the Related Art

In motor vehicles such as recreational vehicles ("RV") or motor coaches, which include some interior living space, it is desirable to have a vent fan assembly, sometimes also referred to as a roof fan assembly, in order to exhaust or vent air and heat and/or pull fresh air into the RV. Various vent or fan assemblies, as they are generally referred to, are known in the prior art.

When an RV is driven, the fan shroud may be lowered so as not to apply undue wind force on the opening mechanism and/or break the shroud. However, other embodiments provide a cover which allows for opening of the shroud during driving operation of the RV so that fresh air may continue to be drawn into the RV. In some embodiments, the cover may be used additionally to leave the vent open for operation, even when a rain or other meteorological event is occurring.

It is desirable to reduce costs, improve manufacturability and improve product experience for customers. The present embodiments provide various improvements to a roof fan assembly.

The information included in this Background section of the specification, including any references cited herein and any description or discussion thereof, is included for technical reference purposes only and is not to be regarded subject matter by which the scope of the invention is to be bound.

SUMMARY

The present application discloses one or more features recited in the appended claims and/or the following features which, alone or in any combination, may comprise patentable subject matter. Present embodiments provide a roof fan assembly with numerous improvements. The roof fan assembly includes a cover which allows for a fan shroud to be opened, even during movement of the recreational vehicle. The structure includes a base clamp which improves connections to the roof of an RV. The base clamp includes a fan and motor which push or pull air out from the RV or into the RV. The base clamp includes a worm gear assembly which includes a worm gear structure to open and close the shroud. The arm may include a sleeve which moves relative to the arm and connects to the shroud at the opposite end. The base clamp includes mounts for connecting the base clamp to the roof as well as allowing for connection of the cover to the fan assembly as a whole. Still further, the structure provides integrated hinges in the base clamp to allow connection of the shroud to the base clamp for pivotal movement.

According to embodiments, a roof fan assembly comprises a base clamp wherein a fan is positioned, a first hinge portion integrally formed in the base clamp, a shroud having a second hinge portion formed integrally with the shroud, the second hinge portion which engages the first hinge portion. An actuator comprising a worm and a worm gear, the worm gear comprising an arm extending therefrom and movable through a substantially vertical plane, the shroud pivoting through a first arc and the arm pivoting through a second arc. A sleeve is disposed on the arm, the sleeve movable on the arm and pivotally connected to the shroud.

According to optional embodiments the first arc and the second arc may differ in radius. Further, the first arc and the second arc may have differing pivot locations. A hand crank may be provided to turn the worm. The base clamp may have a first clamp portion and a second clamp portion. A seal may be disposed in the shroud. The arm may extend in a single plane or the arm may extending through at least two planes. The arm may have at least one bend.

According to some embodiments, a roof fan assembly comprises a pivoting shroud, a base clamp disposed beneath the pivoting shroud, a fan disposed in the base clamp, an arm mounted to the base clamp and pivoting to open and close the shroud, the arm having a worm gear formed thereon and a worm engaging the worm gear, the arm movable through a vertical plane. A sleeve is slidably positioned on the arm and movable on the arm, the sleeve pivotally connected to the cover and, the arm and sleeve movable through a vertical plane.

According to optional embodiments, the base clamp may have a first clamp portion and a second clamp portion. The first clamp portion may have a frame. The second clamp portion may engage the first clamp portion. A hand crank may operably engage the worm to move the arm through a first arc. The shroud may pivot through a second arc. The first arc may differ from the second arc. The arm may move through a vertical plane.

According to some embodiments, a roof fan assembly comprises a roof fan shroud, a base clamp, which receives a fan and motor, a base clamp having a flange, the flange having a plurality of mounts for a vent cover, the mounts each having a slot in a vertical plane and one of an aperture and a protuberance in a horizontal plane and, the vent cover having the other of an aperture and a protuberance cooperating with the mounts and secured by a fastener through the slot.

According to optional embodiments, the roof fan shroud may have a first hinge portion and the base clamp having a second hinge portion.

All of the above outlined features are to be understood as exemplary only and many more features and objectives of a roof fan assembly and may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the roof fan assembly will now be described by way of examples. These embodiments are not to limit the scope of the claims as other embodiments of the roof fan assembly will become apparent to one having ordinary skill in the art upon reading the instant description. Non-limiting examples of the present embodiments are shown in figures wherein:

DETAILED DESCRIPTION

It is to be understood that the roof fan assembly is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-8 various embodiments provide a roof fan assembly for a recreational vehicle ("RV") or the like. The assembly comprises a removable cover and a vent fan having a moveable and removable shroud which may be opened during movement of the RV or during rain or other inclement weather conditions. The term RV may include various land based recreational vehicles, including mobile and fixed structures, as well as marine type vessels or more generally, any structure which may be benefitted by a vent. The roof fan assembly comprises multiple improvements, including a base clamp which allows direct connection of the cover to base clamp. Additionally, a shroud within the cover is pivotally attached directly to the base clamp eliminating the need for a separate hinge structure. Further, a transmission assembly is utilized with an arm and a sleeve to move the shroud from an open to closed position. These features improve manufacturability, lower costs and improve functionality of the roof fan assembly.

Figure 1:
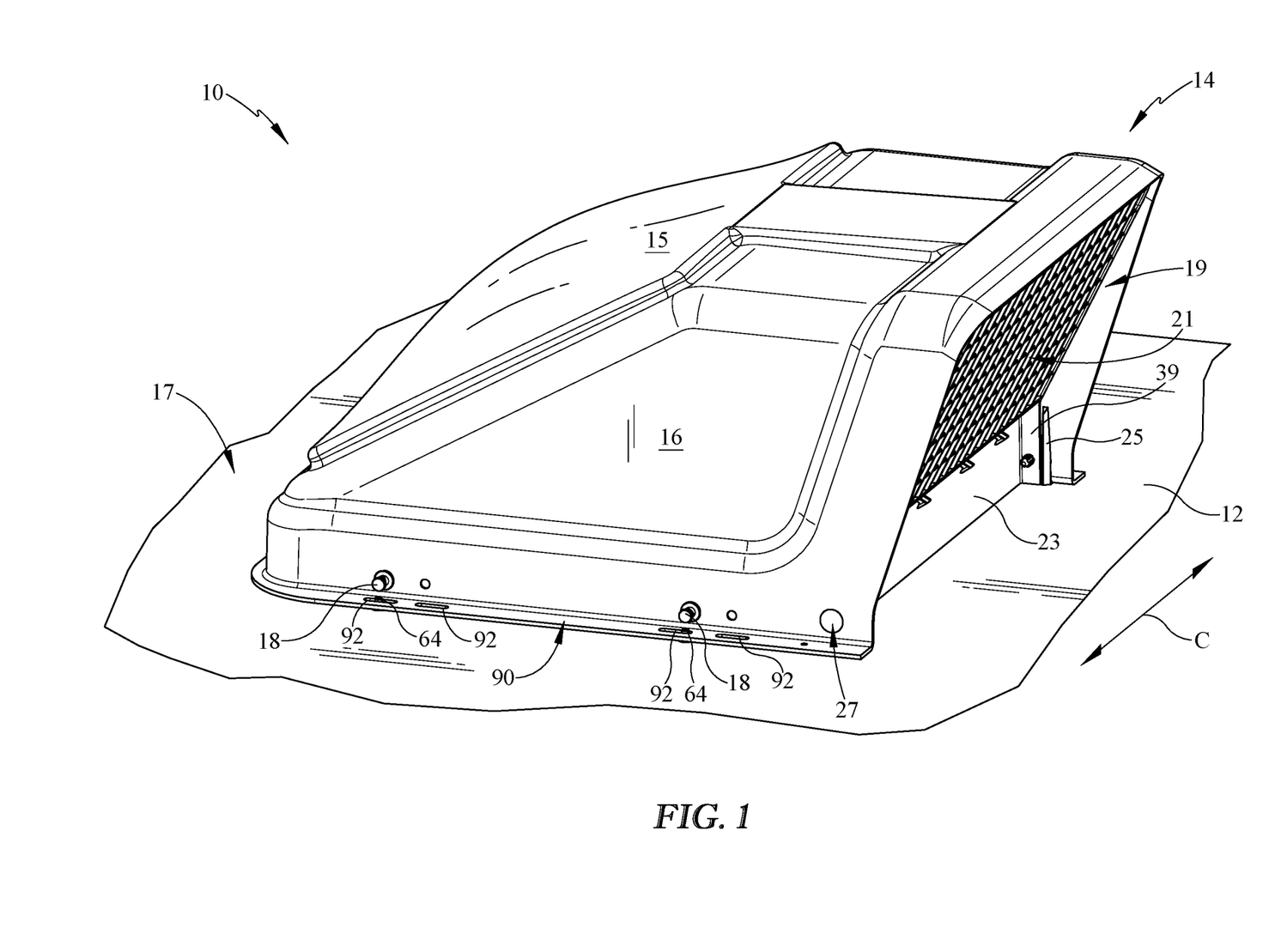
FIG. 1 is a perspective view of a roof fan assembly.

Referring now to FIG. 1, a perspective view of a roof fan assembly 10 is depicted. The roof fan assembly 10 allows for fresh air intake or exhaust of interior RV air outside to the atmosphere. The roof fan assembly 10 is mounted on an RV roof 12 which may have a substantially horizontal surface. The roof 12 however, need not be horizontal as the roof fan assembly 10 may be disposed on angled surfaces as well. Although, it may be desirable to orient the roof fan assembly 10 in such a way as to limit water intrusion inside the fan assembly 10. Still further, the term "roof" is used in describing the assembly 10 but the assembly may alternatively be mounted to other surfaces and/or non-roof structures as well. Throughout the specification, the terms "forward" and "rearward" are used and refer to the forward and rearward directions of the RV. For purpose of reference in this figure, the left side of the figure is the forward end and the right side is the rearward side. Thus, during operation, the air flow moves from left to right across the roof fan assembly 10. Disposed on the roof 12 is the cover 14 which defines a portion of the roof fan assembly 10. The cover 14 is generally open on the bottom and has three sides 16 which may be molded and formed of various shapes. In the instant embodiment, the forward end 17 of the cover 14 is lower for aerodynamic improvement but expands to a taller height moving rearward.

The vent cover 14 may be useful for covering any opening where it is desirable for air, but not water, snow or other undesirable contaminants, to freely pass into the fan assembly 10 and/or RV. The vent cover 14 forces air from the inside to circulate and passively flow to the exterior of a building structure or other enclosure, including a recreational vehicle (RV), tent or the like, despite a heavy storm with wind, rain or snow. Further, as described, the cover 14 may be used with a fan and an electric motor so venting may be automated and active and further, so venting may be controlled as desired. The cover 14 may therefore accommodate motors, fans, as well as the raising and lowering of shrouds (now shown) to provide a desirable result.

The cover 14, for covering a vent and/or opening extending through the roof, or other surface, of a building structure or RV, has a forward end 17 with a generally angled top surface 15 and a pair of sidewalls 16 extending downward from the top 15. The aerodynamic shape makes the cover 14 suitable for use on a mobile RV, but as noted, the device may also be used on fixed structures such as buildings. The top 15 may also comprise a dome which provides clearance for opening of a shroud (not shown) beneath the cover 14. The rear and bottom of the cover 14 are open allowing airflow from beneath the cover 14 or into the RV through the open rear of the cover 14. While the rear of the cover 14 is described as open, it may comprise a grill 19 to allow air flow.

The cover 14 may also comprise a translucent, opaque, or combination of finishes. It may be desirable to allow some ambient light through the assembly 10 and therefore where desirable, such translucence may be suitable.

Near the bottom of at least one of the vertical sides 16 of the cover 14 are fasteners 18 which extend horizontally into cover mounts 60 (FIG. 2) located on a base clamp 30 (FIG. 2), described further herein. The cover mounts 60 allow for use of a fastener 18 to connect the cover 14 directly to a vent fan 20 (FIG. 2) in addition to or alternatively from connection to the roof 12.

Figure 2:
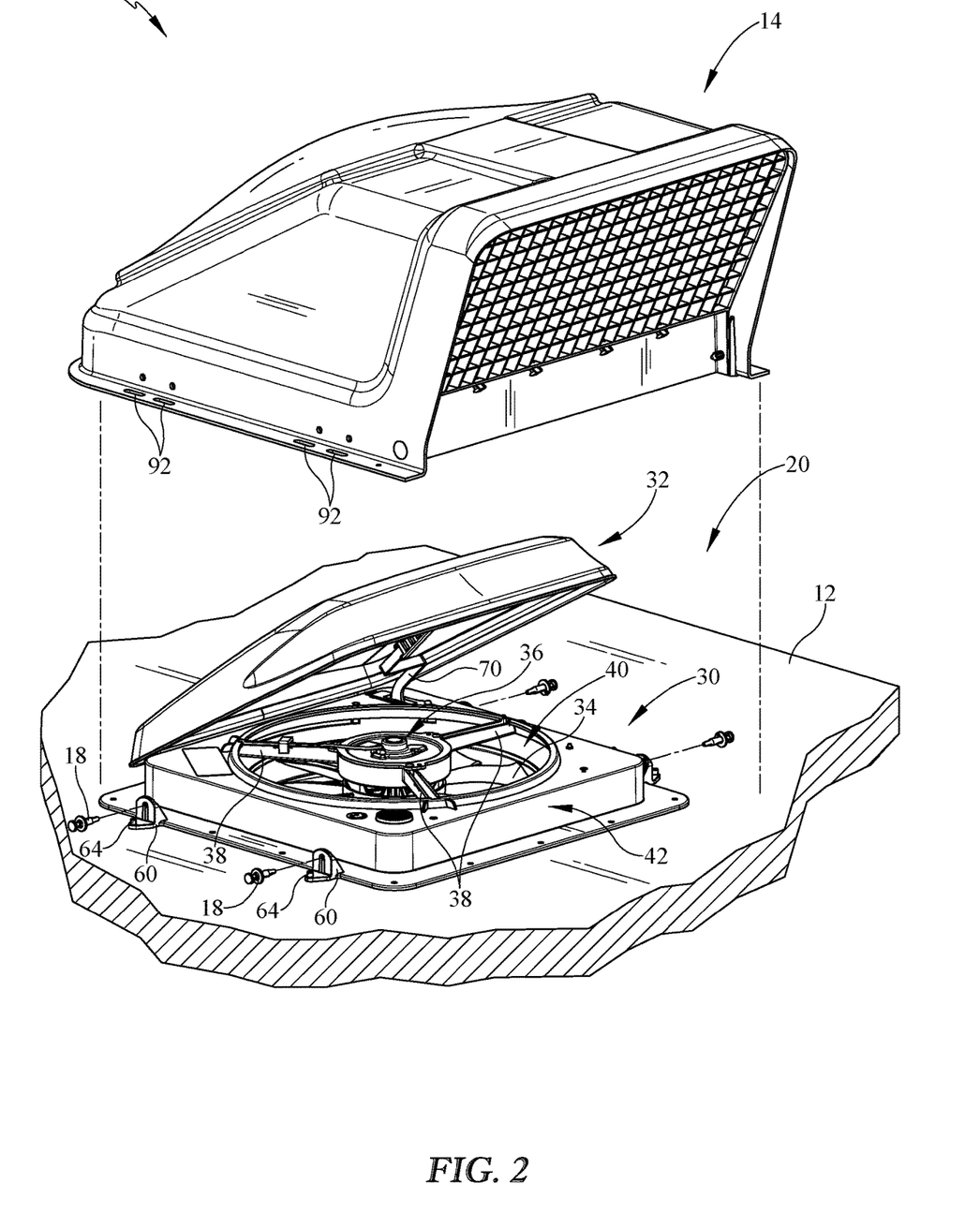
FIG. 2 is a partially exploded view of the roof fan assembly with the cover exploded from the remainder of the roof fan assembly.

Extending about the lower edge of the sidewalls 16 and a front edge 17 of the cover 14 is a flange 90. Along the flange 90 are one or more slots 92 through which protrusions 64 from the cover mounts 60 (FIG. 2) may extend. The slots 92 may extend in the forward/rearward direction. The male/female parts may alternatively be reversed from that which is shown on the cover 14 and mounts 60. The one or more slots 92 are aligned with the protrusions 64 and the cross vehicle position C is set. Further the slots 92 allow for forward-rearward movement of the cover 14 relative to the roof 12 and/or the cover mount 60 (FIG. 2). Once positioned appropriately, the fasteners 18 may be positioned through the cover 14 and cover mounts 60 (FIG. 2). The fasteners 18 may be drive rivets which allow for use and re-use. This is desirable where the cover 14 needs to be removed, for example, and subsequently replaced after some maintenance, cleaning or the like. However, other fasteners for permanent or non-permanent connection may also be used.

The grill 19 may have an upper vent portion 21, a lower splash guard 23 both of which may be defined by a plurality of sides including a bottom, opposite sides, and a top. In one embodiment, the bottom includes an upstanding splash guard 23 extending between the opposite sides. The splash guard 23 may be contiguous with and transverse to the roof 12 or other surface when the grill 19 is secured in the opening to inhibit water from reaching the interior of the RV through the cover 14. Seals may also be added to, overlaid, or integrally formed with, portions of the cover 14, grill 19 or both the cover 14 and the grill 19 to accomplish desired weather resistant/proofing features accordingly. Rigid or non-rigid seals may be included under the splash guard 23 and cover 14, for example.

In some embodiments, the vent portion 21 extends upwardly from the bottom splash guard 23 and outwardly so that the vent portion 21 of the grill 19 overhangs the splash guard 23. The combination of the solid splash guard 23 and the angled orientation of the vent portion 21 of the grill 19 prevents water, which mostly flows perpendicularly downward, from passing through the grill 19 and inside the cover 14. In one non-limiting example, the vent portion 21 of the grill 19 is formed so that it extends from the splash guard 23 at an angle of between about 12° and 25° to create an overhang. In other embodiments, the angle between the splash guard and top portion of the grill 19 may be greater (25.5°-35°) or lesser (5.5°-11.5°) than a figure in the twelve-to-twenty-five degree range of angles.

In the embodiment illustrated, the grill 19 is removably secured in the opening of the cover 14 using mating structures formed in the cover and/or grill 19 so that the grill 19 can be releasably fastened by hand into the cover 14 rear opening. Protruding portions 25 define channels in the interior surfaces of the sides 16, of the cover member 14. In that embodiment, the protruding portions 25, on both sides of the cover 14, define a channel for receiving the splash guard 23 located at the bottom of the grill 19. In one embodiment, a snap fit 27 is also provided by way of an indention receiving a protruding portion(s). These snap fit structures 27 may be formed in the interior surfaces of the sides 16 of the cover member 14 and/or the legs 39 of the grill 19, respectively, or vice versa. Alternatively, the snap fit 27 may be defined by a fastener extending through sides 16.

The cover 14 and grill 19 may be formed from rigid and/or non-rigid materials, for non-limiting example plastic using known means. In some embodiments the rigid and non-rigid features of the cover 14 and grill 19 are formed separately and connected together using means known by skilled artisans. In other embodiments, the rigid and non-rigid features of the cover 14 and grill 19 are integrally formed or over molded. In some embodiments, the cover 14 and grill 19 may be formed from a thermoplastic olefin (TPO). Some portions and parts of the cover 14 and grill 19 may, in some embodiments, be harder than others and/or have varying hardness. Some of the more rigid portions may have a hardness of between about 55-65 Shore D. Other parts and portions of the cover 14 and grill 19, such as the front portions of the channels 22 (FIG. 4) and/or the protruding portion(s) on the legs 39, for example, may be integrally formed with or molded over their corresponding supportive structures and have a hardness of between about 65-70 Shore A.

The above materials, compositions, and/or constituent elements forming the particular plastics discussed and their corresponding physical properties, however, should not be construed as limiting. High density polyethylene (HDPE) has been used to form an embodiment of the invention. Preferably, any of various known UV stabilizers or combinations thereof are preferred to be added in the plastic since the vent cover may be used outdoors. Other materials, compositions, and/or constituent elements forming rigid and non-rigid materials or plastics possessing the physical properties useful in a manner as herein described may be appropriately desirable and availed using different materials, compositions, and/or constituent elements without undue experimentation and should be considered to fall within the scope of Applicants' innovative vent cover and grill.

Referring now to FIG. 2, a partially exploded perspective view of the roof fan assembly 10 is shown. The cover 14 is removed from the mounts 60 and roof 12 so that the vent fan 20 of the roof fan assembly 10 is depicted in an assembled view. The cover mounts 60 may be seen in the depicted embodiment which align with and engage the slots 92 and the apertures 64 in sidewall 16 which receive the fasteners 18.

The vent fan 20 of the roof fan assembly 10 comprises a base clamp 30 and a pivotally connected shroud 32. Within the base clamp 30, a fan 34 and motor 36 are located which provide a functionality to draw air from the exterior into the RV or to exhaust interior air from the RV. The motor 36 and fan 34 may be supported from one or more struts 38 which extend from a perimeter of a fan aperture 40 located in the base clamp 30. These allow for the fan 34 to be generally centered in the fan aperture 40.

The figure also shows an arm 70 extending from the base clamp 30 toward the shroud 32. The arm 70 is utilized to move the shroud 32 between opened and closed positions. The shroud 32 may be opened by operating a hand crank 78 (FIG. 4) in the interior of the RV or building. Such hand crank 78 may be positioned on the bottom side of the roof 12 near the ceiling of the RV, for example.

Figures 3, 3A:
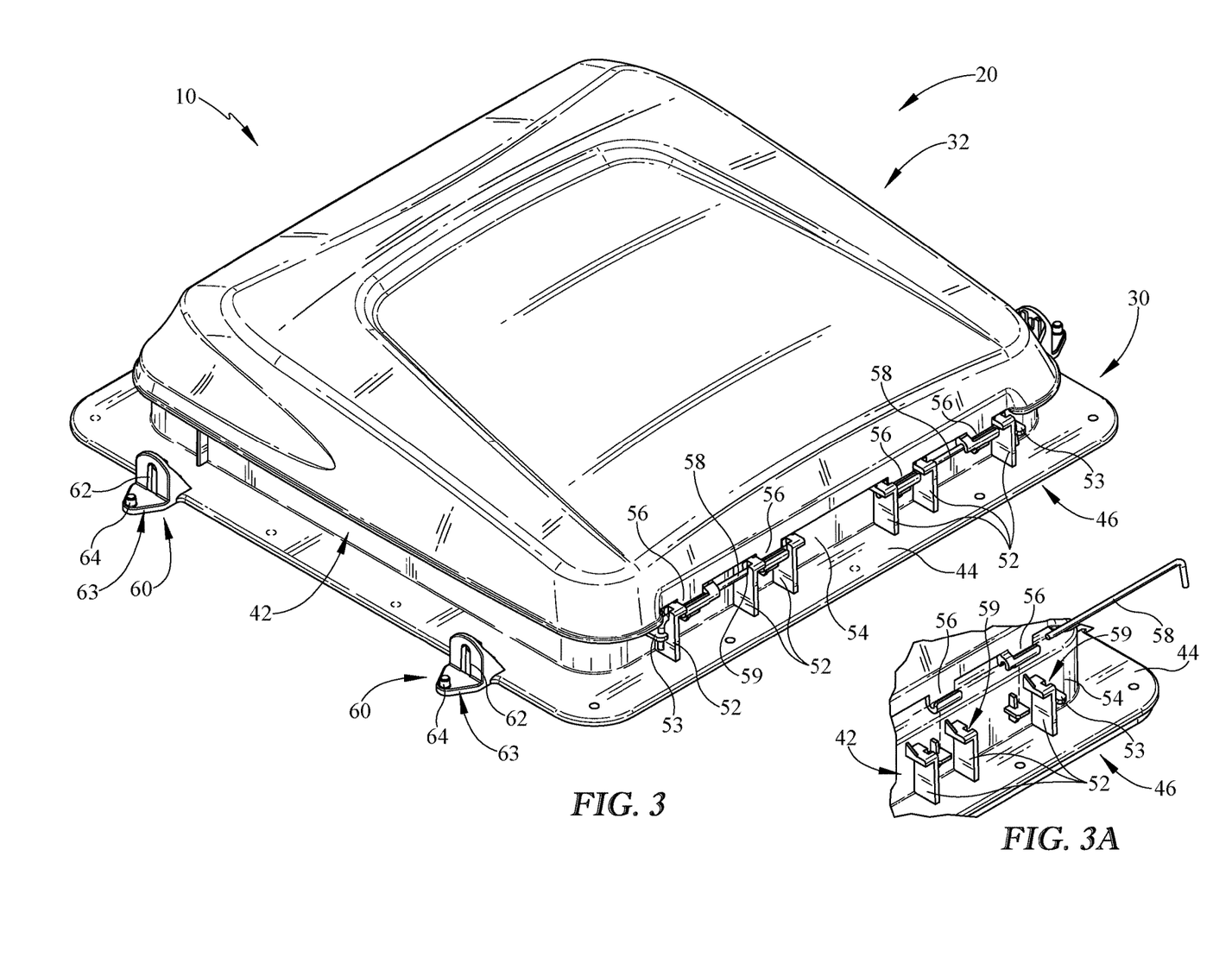
FIG. 3 is a perspective view of a base clamp and top shroud of the roof fan assembly.
FIG. 3A is a detail exploded perspective view of an integral hinge.

Referring additionally now to FIG. 3, wherein a perspective view of the shroud 32 and base clamp 30 are shown, the shroud 32 is closed and the cover 14 is removed. The base clamp 30 may be formed of multiple portions and comprises a first base clamp portion 46 having a body 42 and a clamp flange 44, which may be generally square shaped and horizontal. Other shapes may also be utilized. The body 42 extends vertically from the clamp flange 44. The cover mounts 60 are located along the periphery of the clamp flange 44.

The body 42 extends upwardly from the clamp flange 44 defining a space wherein the fan 34 (FIG. 2) and motor 36 (FIG. 2) may be located. The fan aperture 40 (FIG. 2) is located in the upper surface of body 42.

Figure 4:
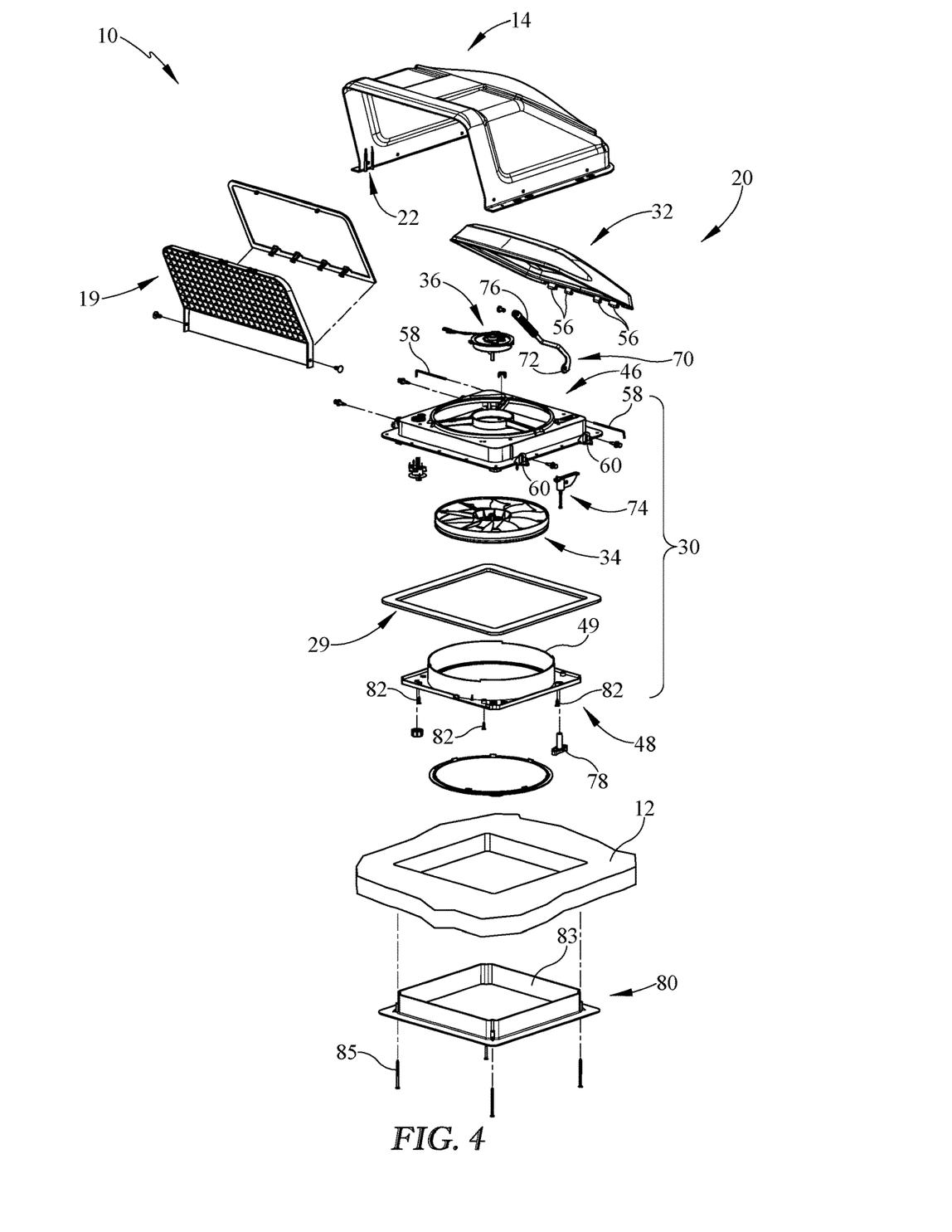
FIG. 4 is an exploded perspective view of the roof fan assembly of FIG. 1.

The base clamp 30 is defined in part by the first base clamp portion 46 and the second base clamp portion 48 (FIG. 4) and a trim 80 (FIG. 4). The first base clamp portion 46 connects with a second base clamp portion 48 from below and with the trim 80. As suggested by the name, the base clamp 30 captures the RV roof 12 between components thereof. In some embodiments for example, the first base clamp portion 46 may be disposed along the roof 12 while the trim 80 is positioned along the ceiling of the RV roof 12. A space is defined between the first base clamp portion 46 and the trim 80 wherein the roof 12 and ceiling are captured therebetween. The cover 14 is then positioned on the base clamp 30 to cover the fan assembly 10.

With additional reference to FIG. 3A, extending from the clamp flange 44 of the first clamp portion 46 are integrally formed first hinge structures 52. The hinge structures 52 extend upwardly along the body 42. These hinge structures 52 may be defined by brackets which, in some embodiments, extend from the horizontal surface of the clamp flange 44 upwardly along a vertical wall 54 of the body 42 may have a horizontal portion for stiffening. The hinge structures 52 also include pin holes 59 through which a hinge pin 58 may extend. The pin 58 is retained in position in part by the hinge structures 52. The shroud 32 has an integrally formed shroud hinge structure 56 which compliments the hinge structures 52 of the clamp flange 44. The shroud hinge structure 56 may be J-shaped and extends between the shroud hinge structures 52. The shroud hinge structure 56 extends downwardly between hinge structures 52 and defines a second bound for the pin 58. Thus, when the shroud 32 is placed on the first clamp portion 46, the structures 52, 56 interweave and allow for insertion of the pin 58, inter-locking the shroud 32 and first base clamp portion 46. In operation, the structures 56 provide an upper bound for the pin 58 which then locks the shroud hinge structure 56 in position. When the shroud 32 is positioned on the clamp flange 44, the hinge structures 52, 56 are aligned to form a boundary and receive a hinge pin 58 or other structure. Further, the hinge pin 58, in combination with hinge structures 52, 56 formed on the clamp flange 44 and shroud 32, allow for pivoting movement of the shroud 32 relative to the first base clamp portion 46. In manufacturing this way, two of the hinge structures 52, 56 are integrally formed with the shroud 32 and first base clamp portion 46 so that the hinge pin 58 may be utilized to tie the hinge structures 52, 56 together. The hinge pin 58, according to some embodiments, may be L-shaped and located between the two integrated hinge structures 52, 56 to connect the shroud. The base clamp portion 46 has a molded snap-in feature 53 that receives the short leg of the L-shaped hinge pin 58 when rotated down, thereby locking the pin 58 in place and eliminating need for any other fasteners.

The shroud 32 may be formed of various materials but may be translucent or semi-translucent to allow some light to pass through the shroud 32 depending on the material of the cover 14 (FIG. 1). Further, such structure may also be opaque if the shroud 32 is used with a cover 14 as it may be desirable to limit viewing of any of the internal structures of the cover 14 when the shroud 32 is covered. Still further, some, all or more of the shroud 32 surfaces may also include surface texturing.

Also shown positioned about the clamp flange 44 are a plurality of cover mounts 60. The cover mounts 60 allow for positioning or locating of the cover 14 (FIG. 1) on the base clamp 30 and for horizontal fastening through the vertical holes or slots 62 of the cover mount 60. Further, the cover mount 60 has a horizontal tab 63 with a protuberance 64 which may align with a slot 92 (FIG. 1) on the cover 14 for desired positioning. The protuberances 64 provide for cross or lateral location of the cover 14 while the vertical slots 62 locate the cover in the forward-rearward direction, when holes in the cover 14 are aligned with the slots 62. When the cover 14 is positioned on the mounts 60, the cover 14 does not require additional fasteners to extend through the roof 12 or other surface.

Referring now to FIG. 4, an exploded perspective view of the roof fan assembly 10 is shown comprising the cover 14 and vent fan 20. At the top of the figure, the cover 14 is depicted and is shown with an open rear area and an open bottom wherein the fan 34 may pull air through the rear grill 19 and direct the air downwardly through the base clamp 30.

The cover 14 allows for positioning of the shroud 32 in either the closed position or in an open position such that the shroud 32 may rotate upward and space is provided beneath the cover 14 for such open positioning. This is desirable since air flow may be pulled through the grill 19 and downwardly through the fan 34 in the base clamp 30 or alternatively, in the opposite direction. The shroud 32 is pivotally connected to the first base clamp portion 46 by way of the hinge pin 58 and the plurality of hinge structures 52, 56 on the first base clamp portion 46 and the shroud 32.

The base clamp 30 is formed of the first base clamp portion 46, the second base clamp portion 48 and the trim 80. The first base clamp portion 46 is generally square in shape although other shapes may be utilized which cooperate with the cover 14 and with the shroud 32. Also connecting the first base clamp portion 46 and the shroud 32 is an arm 70. The arm 70 is mounted in the first base clamp portion 46 for rotation by a hand crank 78 or other actuator. The hand crank 78 extends through the second base clamp portion 48 and when rotated by a user, further rotates the worm 74 and the worm gear 72 disposed on the arm 70. The hand crank 78 drives rotation of the worm 74 and rotation of the worm 74 drives rotation of the worm gear 72 which is connected to the arm 70. The worm gear 72 may be connected to the arm 70 or may be formed thereon as shown. The arm 70 therefore rotates through this actuation relative to the first base clamp portion 46.

The arm 70 includes various segments which may be in a single plane, for example a vertical plane, or which may bend through a horizontal plane and thus be located in various vertical planes. The arm 70 further comprises a sleeve 76 disposed at an end opposite the worm gear 72. The sleeve 76 may slide relative to the arm 70. The sleeve 76 is connected to the shroud 32 so that when the shroud 32 opens and closes, the sleeve 76 can compensate for the difference in arc shape of the arm 70 movement and the shroud 32. The connection of the sleeve 76 to the shroud 32 may be a pivotal connection so that the sleeve 76 pivots relative to the shroud 32.

Above the first base clamp portion 46 is the motor 36 and the fan 34 is shown below the first base clamp portion 46. The base clamp portion 46 has a height which defines a cowl for air flow by the fan 34 and wherein the fan 34 rotates.

Beneath the fan 34 is a seal 29 which may be disposed between the first base clamp portion 46 and the roof 12 (FIG. 1). The seal 29 may be rigid or non-rigid and may be disposed beneath the clamp flange 44 of the first clamp portion 46 to inhibit contaminants from entering the RV or building between the roof 12 and the base clamp portion 46.

Beneath the seal 29 is the second base clamp portion 48. The second base clamp portion 48 includes a collar 49 which is circular in shape and extends upwardly into the first base clamp portion 46. The lower surface of the second base clamp portion 48 includes an aperture through which the hand crank 78 passes. The second base clamp portion 48 is received by the first base clamp portion 46. The outer perimeter of the second base clamp 48 is sized to fit within a lower opening of the first base clamp portion 46.

Beneath the roof 12 is a trim piece 80 which positions against the lower surface of the roof 12 that is the ceiling of the RV, and provides an aesthetically pleasing finish for the remainder of the parts. The trim 80 has an upstanding wall 83 which may correspond in dimension to the outer dimension of the second base clamp portion 48. In this way, the upstanding wall 83 extends up to or slightly beyond the lower surface of the second base clamp portion 48. A plurality of fasteners 85 are shown extending upwardly through the trim 80 or extending (82) from the second base clamp portion 48 to connect to the first base clamp portion 46. The fasteners 82, 85 therefore retain the assembly 10 tightly against the roof 12 and ceiling surface thereof. The cover 14 may be connected to the cover mounts 60 located on the first base clamp portion 46 and provide both locating and fixing function relative to the first base clamp portion 46.

Figure 5:
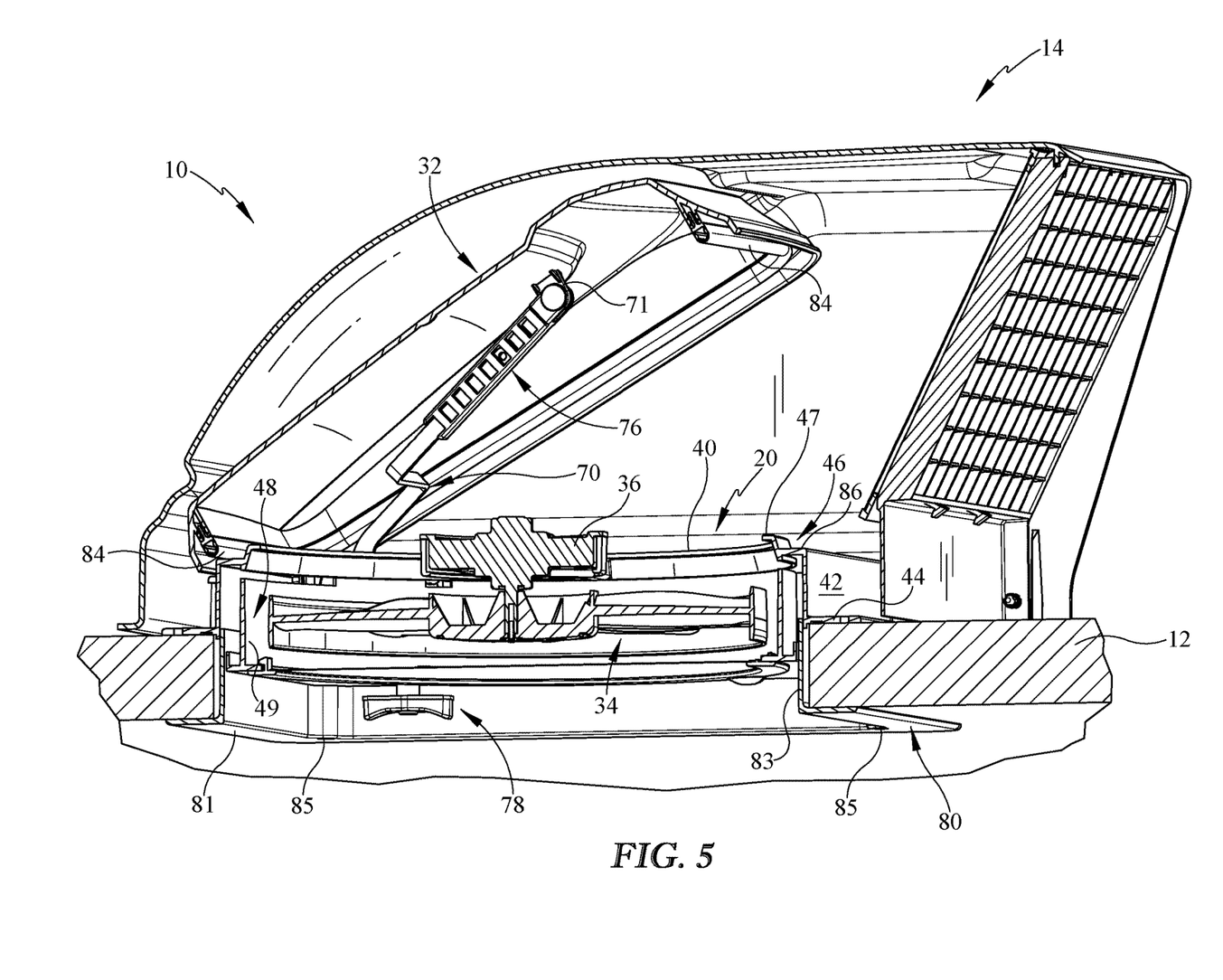
FIG. 5 is a sectioned perspective view of the roof fan assembly.

Referring now to FIG. 5, a perspective assembly view of the roof fan assembly 10 is shown. At the top of the assembly 10 is the cover 14. In the embodiment, the top 15 (FIG. 1) of the cover 14 may be rounded or domed so that the shroud 32 may be opened as depicted. In the depicted position, the shroud 32 is shown opened by the arm 70 and the sleeve 76. The sleeve 76 is pivotally connected to the shroud 32 by a sleeve pivot 71 which is fixed on an undersurface of the shroud 32 and engages the sleeve 76 by fastener or other connection allowing for pivot between the sleeve 76 and the sleeve pivot 71. The sleeve 76 is therefore fixed relative to the shroud 32 except for the pivoting movement and the arm 70 is fixed, allowing for pivoting, relative to the first base clamp portion 46. However, the movement of the shroud 32 between the opened and closed position results in two arcs of movement. One arc A1 (FIG. 8) is created by the pivoting movement of the shroud 32 relative to the first base clamp portion 46 at the forward end of the base clamp portion 46. The second arc A2 (FIG. 8) is defined by the pivoting movement of the arm 70 relative to the first base clamp portion 46. The pivot positions for these two movements differ. Therefore, to accommodate the movement of the shroud 32 and the arm 70, both of which pivot relative to the first base clamp portion 46, the sleeve 76 and the arm 70 compensate for the differing arcuate movement.

Specifically, to compensate for this difference in arc travel of the arm 70 and the shroud 32 during opening and closing movement, the arm 70 may move linearly within the sleeve 76. The sleeve 76 may be formed of a hollow structure having a similar cross-sectional shape to that of the arm 70 so that the arm 70 may slide therethrough. However, at the fully extended or fully retracted positions, the arm 70 and sleeve 76 do not come apart from one another but instead the sleeve 76 remains on the arm 70.

Shown along the perimeter of the shroud 32 is a seal 84. The seal 84 is positioned near a periphery of the shroud 32 and inhibits water or other environmental contaminants from entering the vent fan 20 when the shroud 32 is in a closed position.

On the first base clamp portion 46, a seal landing 86 is formed by a surface which is engaged by the seal 84. Extending about the inner periphery of the seal landing 86 is the fan aperture 40. The landing 86, in combination with the seal 84, form a boundary so that contaminants or other materials, which may be on or around the seal landing 86, are not drawn into the fan aperture 40 by the fan 34. The first base clamp portion 46 also includes the body 42 which may be defined by a vertical or angled wall extending downwardly from seal landing 86 to raise the first base clamp portion 46 toward the clamp flange 44. The first base clamp portion 46 is also defined by the seal landing 86 and a lip 47 in which the fan aperture 40 is defined. Beneath the first base clamp portion 46 is the roof 12 of the RV. The clamp flange 44 is positioned on an upper surface thereof. Along an opposite, interior surface, the vent fan 20 includes the trim 80 which has trim flange 81 engaging the interior surface and a trim wall 83. Shown positioned interior of the trim 80 and the first base clamp portion 46, is the second base clamp portion 48. The second base clamp portion 48 may be formed in the cross-sectional shape of an upside down "T" according to some embodiments, and engages an inner surface of the trim 80. The trim 80 has a substantially square flange and the clamp flange 44 of the first base clamp portion 46 may be square in shape. However, the fan aperture 40 is circular and the second base clamp portion 48 has an outer perimeter which is square in shape or some other shape corresponding to the inner surface shape of the trim 80 while an upwardly extending wall 49 of the second base clamp portion 48 is circular in shape corresponding to the shape of the fan aperture 40. In addition to the vertical wall 49, the second base clamp portion 48 comprises a lower surface wherein the hand crank 78 extends through. This allows a user to access the crank 78 and open or close the shroud 32.

Figure 6:
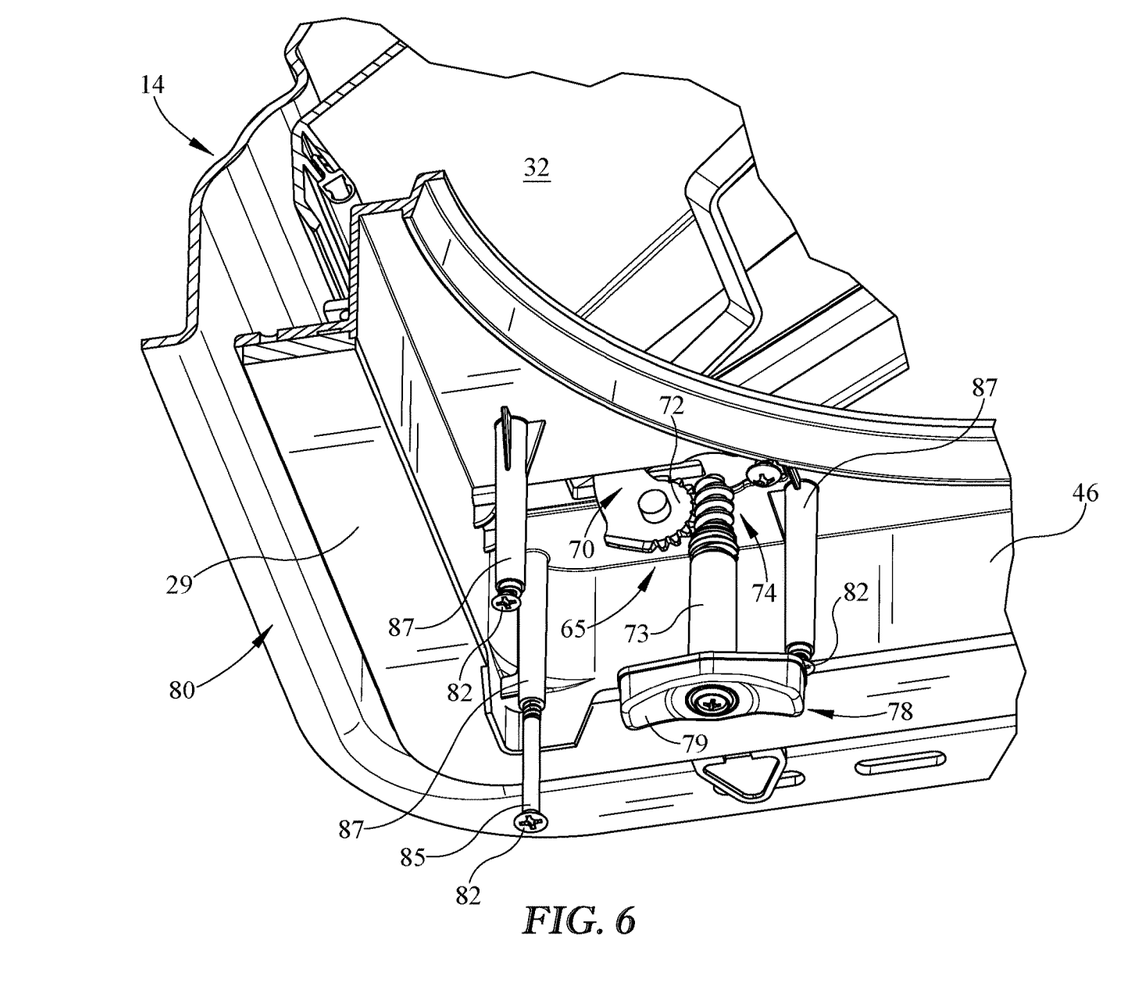
FIG. 6 is a lower perspective view of a portion of the worm and worm gear which move the shroud.

Referring now to FIG. 6, a bottom perspective view of the transmission 65 is depicted. With the second base clamp portion 48 (FIG. 5) removed, the transmission 65 is revealed. The crank handle 78 has a hand grasp 79 and a shaft 73 that includes the worm 74. As the handle 78 is rotated, the worm 74 rotates therewith and the worm 74 is engaging the worm gear 72. The worm gear 72 is operably connected to the arm 70 causing movement of the arm 70 when the crank handle 78 is rotated. The arm 70 and worm gear 72 are pivotally connected to the first base clamp portion 46. Due to such movement of the arm 70, the shroud 32 also moves between an open and closed position within the cover 14. Various transmissions may be utilized to convert rotation of a user input to movement of the arm 70. However, the worm gear 72 may be utilized in some embodiments due to its ability to inhibit reversing of the arm 70 and unintended closing of the shroud 32.

Also shown in FIG. 6, a plurality of fasteners 82 are also shown extending through the first base clamp portion 46. The fasteners 82 may be utilized to extend through the second base clamp portion 48 (FIG. 5) and extend upwardly into the first base clamp portion 46 to retain the second base clamp portion 48 beneath the first base clamp portion 46. Also shown in FIG. 6 is a fastener 85 which connects the trim 80 to the first base clamp portion 46. Each of the fasteners 82, 85 are shown engaging fastener stands 87.

Figure 7:
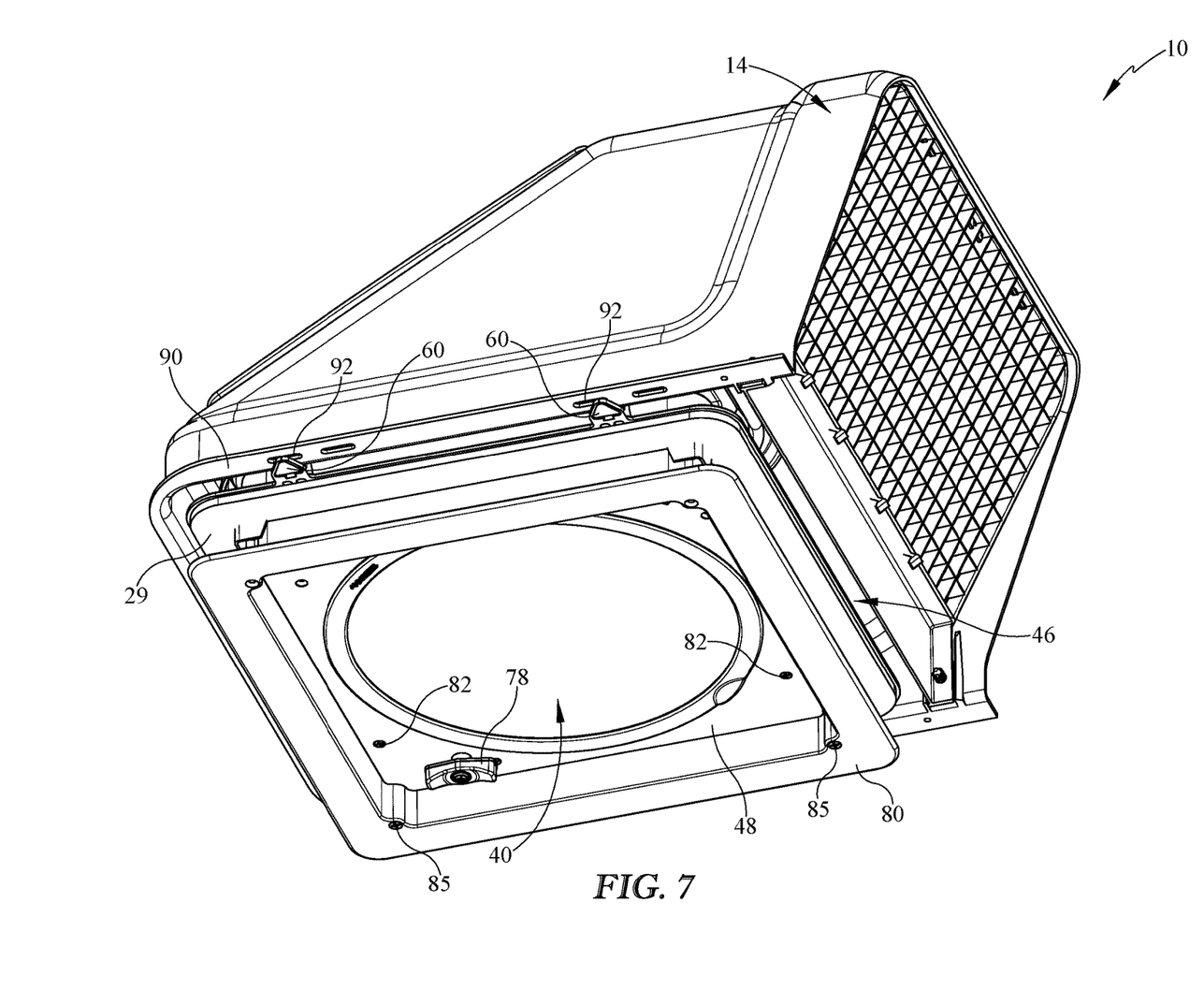
FIG. 7 is a lower perspective view of the roof fan assembly.

Referring now to FIG. 7, an assembled view of the roof fan assembly 10 is depicted in an assembled fashion. In this view, the trim 80 is shown with two of the fasteners 85 which connect to the first base clamp portion 46 and additionally, the fasteners 82 are shown extending through the second base clamp portion 48. The hand crank 78 is shown extending through the second base clamp portion 48 and a central aperture is shown in the second base clamp portion 48 which allows air flow to or from the interior of the RV. Further, a space is shown between the first base clamp portion 46 and the trim 80. The space provides for clamping function of the roof fan assembly 10 to the roof 12 (FIG. 1). In other words, the roof structure 12 is positioned in and captured between these two parts 46, 80 and such allows for proper positioning of the assembly 10.

Extending from the base clamp portion 46 are the mounts 60. Each of the mounts 60 comprises the protuberance 64 (FIG. 3) extending upwardly. These structures 64 provide a seat for the cover flange 90 of the cover 14. Further the cover flange 90 includes a flange slot 92. The slot 92 and the protuberance 64 provide a locating function for the roof cover 14 in a forward/rearward direction. Additionally, the fastener 18 (FIG. 1) may be inserted through the rain cover 14 to engage the slots 62 (FIG. 3) of the cover mount 60. This locates and retains the cover 14 in the full rearward direction as well as the lateral or cross-vehicle direction as well.

Figure 8:
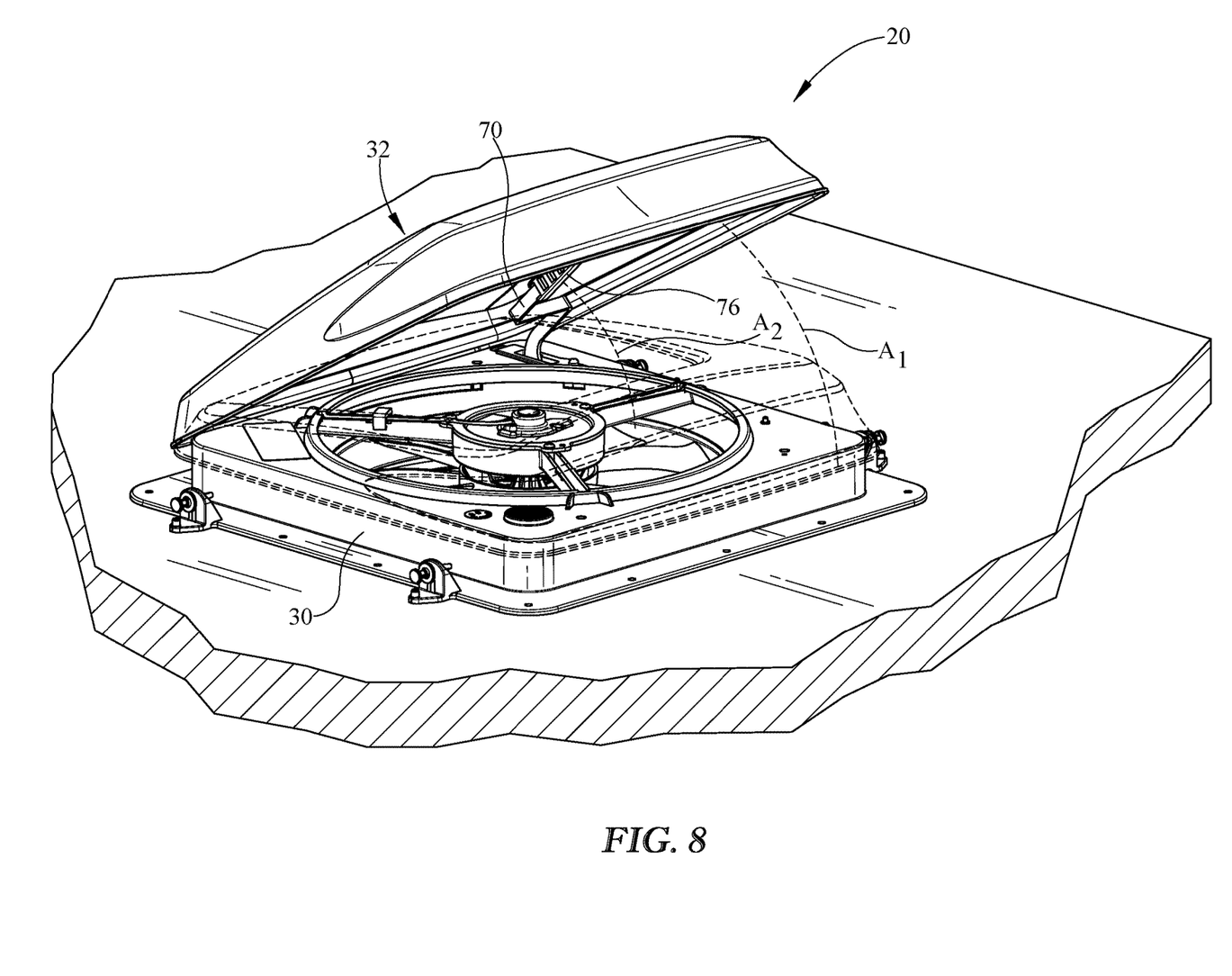
FIG. 8 is a perspective view of the fan assembly with the shroud shown in two positions.

Referring to FIG. 8, a perspective view of the vent fan 20 is shown. The shroud 32 is shown in solid line in an upper position rotated open relative to the base clamp 30. The shroud 32 is also shown in broken line in a closed position. In moving from the open to closed position, or vice versa movement, there are two arcs of movement. The first arc A1 is that of the shroud 32. The second arc A2 is shown in broken line and presents the arm 70 movement. The arcs A1 and A2 have different pivot positions. Both arcs A1 and A2 define movement through a vertical plane. Due to the two arcs of differing length and differing pivot locations, the sleeve 76 moves along the arm 70 to maintain for connection of the shroud and transmission 65 (FIG. 6). As the shroud 32 closes, the arm 70 moves into the sleeve 76 and oppositely, as the shroud 32 opens, the arm 70 extends from the sleeve 76.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A roof fan assembly, comprising:
   a base clamp wherein a fan is positioned;
   a first hinge portion integrally formed in said base clamp;
   a shroud having a second hinge portion formed integrally with said shroud, said second hinge portion which engages said first hinge portion;
   an actuator comprising a worm and a worm gear, said worm gear comprising an arm formed integrally with said worm gear and extending from said worm gear, and said arm movable through a substantially vertical plane;
   said shroud pivoting through a first arc and said arm pivoting through a second arc; and,
   said arm being a one-piece structure having a first arm portion having a first end extending from said worm gear and a second end extending from said first end further from said worm gear, and a second arm portion having a first end portion closer to said first arm portion and a second end portion and positioned closer to the shroud, said second end of said first arm portion and first end of said second arm portion joined by a bend portion that provides a lateral offset of said second arm portion from said first arm portion and wherein said first arm portion and said second arm portion are generally parallel;
   said second end of said second arm portion extending into a sleeve, said sleeve being slidably movable relative to said arm, said sleeve pivotally connected to, and at a fixed location of said shroud, said shroud at an end of said sleeve opposite said worm and said worm gear for pivotal movement of said sleeve relative to said shroud.

2. The roof fan assembly of claim 1, said first arc and said second arc differing in radius.

3. The roof fan assembly of claim 1, said first arc and said second arc having differing pivot locations.

4. The roof fan assembly of claim 1, further comprising a hand crank to turn said worm.

5. The roof fan assembly of claim 1, said base clamp having a first clamp portion and a second clamp portion.

6. The roof fan assembly of claim 1, further comprising a seal in said shroud.

7. The roof fan assembly of claim 1, said arm extending in a single plane.

8. The roof fan assembly of claim 1, said arm extending through at least two planes.

9. The roof fan assembly of claim 5, said first clamp portion having a frame.

10. The roof fan assembly of claim 9, said second clamp portion engaging said first clamp portion.

11. The roof fan assembly of claim 1, further comprising a hand crank operably engaging said worm to move said arm through said first arc.

12. The roof fan assembly of claim 11, said pivoting shroud pivoting through said second arc.

13. The roof fan assembly of claim 12, said first arc differing from said second arc.

14. The roof fan assembly of claim 11, said arm moving through a vertical plane.

* * * * *